United States Patent [19]

Mokler

[11] Patent Number: 5,595,282

[45] Date of Patent: Jan. 21, 1997

[54] ARTICLE TREATMENT APPARATUS

[75] Inventor: Bernhard Mokler, Markgröningen, Germany

[73] Assignee: LTG Lufttechnische GmbH, Stuttgrat, Germany

[21] Appl. No.: 365,612

[22] Filed: Dec. 28, 1994

[30] Foreign Application Priority Data

Feb. 11, 1994 [DE] Germany ............ 44 04 307.4
Nov. 17, 1994 [DE] Germany ............ 44 40 926.5

[51] Int. Cl.$^6$ ................................. B65G 15/32
[52] U.S. Cl. .............. 198/689.1; 34/216; 414/157
[58] Field of Search ............ 198/689.1; 271/197; 414/157, 196; 34/207, 208, 216, 217

[56] References Cited

U.S. PATENT DOCUMENTS

| | | | |
|---|---|---|---|
| 1,278,537 | 9/1918 | Wegner | 198/689.1 |
| 2,813,637 | 11/1957 | Perry et al. | 271/197 X |
| 3,096,162 | 7/1963 | Jepson | 34/216 X |
| 3,202,302 | 8/1965 | Insolio | 198/689.1 X |
| 4,768,643 | 9/1988 | Lehart | 198/689.1 X |
| 4,815,581 | 3/1989 | Deutschländer | 198/689.1 X |
| 5,133,543 | 7/1992 | Eitel et al. | 271/197 X |
| 5,373,933 | 12/1994 | Planke et al. | 198/689.1 |

FOREIGN PATENT DOCUMENTS

| | | |
|---|---|---|
| 345737 | 10/1978 | Australia . |
| 0179564 | 4/1986 | European Pat. Off. . |
| 1844580 | 11/1961 | Germany . |
| 2128102 | 12/1971 | Germany . |
| 3001531 | 7/1981 | Germany . |
| 4005349 | 8/1991 | Germany . |
| 4013302 | 10/1991 | Germany . |
| 1094917 | 12/1967 | United Kingdom . |

OTHER PUBLICATIONS

Publication "STETIGFÖRDERER", p. 157, Neues PTFE–beschichtetes Netzgewebe für Förderbänder.
Publication "GLÜCKAUF", 1981, 117, No. 14, pp. 812 to 816.

Primary Examiner—David A. Bucci
Attorney, Agent, or Firm—Anderson Kill & Olick P.C.

[57] ABSTRACT

An article treatment apparatus including at least one treatment zone, and a conveyor for conveying articles through the treatment zone, with the conveyor having an air-permeable conveyor belt displaceable along a support provided with a plurality of vacuum openings along a longitudinal extent of the support, and formed of at least two conveyor sections abutting each other, with an operational cross-section of vacuum openings beneath a support area for a conveyed article, which is located at least partially in a joint region, defined by the two sections, being larger than an operational cross-section of vacuum openings beneath a support area for the article, which is located in a region of the conveyor section other than the joint region.

21 Claims, 4 Drawing Sheets

ARTICLE TREATMENT APPARATUS

BACKGROUND OF THE INVENTION

The invention relates to an article treatment apparatus, in particular, to an apparatus for drying boxes, and including a conveyor having article-conveying, air-permeable means displaceable along a support provided with a plurality of vacuum openings.

An article treatment apparatus of the above-described type is known. The known apparatus represents an apparatus for drying lacquered articles generally having a printed pattern thereon, in particular, for drying lacquered boxes. The known drying apparatus includes a conveyor provided with an air-permeable conveyor belt. The conveyor has a likewise air-permeable support for supporting the conveyor belt during the displacement of the conveyor belt, together with boxes, through the drying zones or drying ovens.

During the displacement through the drying ovens, the lacquered, fresh-painted boxes are subjected to a stream of a drying air from above. The drying stream also penetrates through the conveyor belt and the support, due to their air-permeability, and thereby the drying process runs more rapidly. As a result, the articles arrive at the exit of a last drying oven in a dried condition.

The conveyor of the known apparatus includes a metal chain which requires use of a powerful drive and thus, adversely affects the stability of the articles on the conveyor. The conveyors of the known apparatuses, instead of a metal chain, may include a belt made of a plastic material.

Usually, the vacuum openings in the conveyor support are arbitrarily arranged. Because of this, infiltration air in the joint regions of the conveyor support (the joint regions are formed not only by abutting each other sections of the support, but also can be formed by separation walls or battering walls used for separating the vacuum chambers) cannot be compensated.

Because of the infiltration air, the stability of the conveyed articles on the conveying belt cannot be completely assured.

Accordingly, an object of the invention is an article treatment apparatus of the above-described type in which the stability of the articles, which are conveyed on conveying means, is substantially improved.

SUMMARY OF THE INVENTION

This and other objects of the invention, which will become apparent hereinafter, is achieved by providing in the conveyor of an article treatment apparatus comprising of at least one treatment zone, a support which is formed of at least two support sections abutting each other and defining together a joint region, with an operational cross-section of vacuum openings in a support area for a single article and which is located in the joint region, being larger than the operational cross-section of vacuum openings in a support area for a single article and which is located in a region other than the joint region.

Forming of the conveyor support of a plurality conveying sections substantially decreases manufacturing costs. However, the adjacent, abutting each other, conveyor sections form joint regions which cause non-homogeneity of air flow therethrough, whereby the instability of the conveying articles is increased.

Non-homogeneity may result from providing separation and/or battering walls beneath the support. Here, by the separation and/or battering walls, the joint regions formed thereby are understood. Because in joint regions infiltration of air takes place, a vacuum-free or reduced vacuum zone is created in the joint regions, i.e., a zone located outside of a vacuum or suction chamber.

Because the joint regions are located outside of the vacuum or suction chambers, no vacuum or very small vacuum is generated in these regions, and the conveyed articles are not sufficiently drawn to the conveying means (conveyor belt) in the joint regions and, therefore, their stability on the conveyor belt in these regions is reduced.

When a support is formed of several support sections and each section is associated with a separate vacuum or suction chamber, there is no continuity in the air flow in the joint regions. According to the invention, the discontinuity of the air flow is compensated by providing in the first zone (which includes the joint region between the adjacent conveyor sections and bordering portions of the sections), vacuum openings having a summary operational cross-section larger than the operational cross-section of vacuum openings located in other zones remote from the joint region.

The first zone forms a marginal or edge perforation portion of a respective conveyor section, and the second, remote zone forms a normal perforation portion. There exists different possibilities of increasing of the operational cross-section of the vacuum openings in the edge zone in comparison with the operational cross-section of the vacuum openings in the normal zone.

For example, it is possible to make the diameter of the vacuum openings in the edge zone smaller than the diameter of the vacuum openings in the normal zone, while substantially reducing the spacing between the openings. As a result, the operational cross-section of the vacuum openings in the edge zone will become larger than the operational cross-section of vacuum openings in the normal zone.

Advantageously, the edge zone has a greater number of vacuum openings than the second, normal zone. However, that does not mean that the size of the vacuum openings in both zones are always the same. As it has already been discussed above, the vacuum openings of the first, edge zone may have a smaller size than the vacuum openings of the second, normal zone.

The necessary size of the vacuum openings is determined by taking into consideration the dimensions of the conveyed article, the mesh geometry of the conveyor belt, when a grid belt is used as a conveyor belt, and the geometry of the infiltration air channels formed in the joint region, as well as the parameters of the hot air flow volume, which is determined in accordance with the drying requirements, through the conveyor belt.

Advantageously, each support area of the conveyor support associated with a conveyed article has at least one and, preferably, several vacuum openings, independent on the position of the article on the conveyor belt. This insures an optimal stability of the conveying articles on the conveyor belt as in the first zone so in the second zone.

As it has already been mentioned above, each conveyor section is associated with a separate vacuum chamber which communicates with the vacuum openings of the respective conveyor section. This insures an optimal air flow through all of the vacuum openings provided in the section covering, and results in optimal suction or vacuum characteristics. Advantageously, all of the vacuum chambers may be connected to a common vacuum source.

The joint region defines a third, vacuum-free or reduced vacuum zone or a third zone. The joints, as aforementioned, can be formed by separation walls of the vacuum chambers or by seams. The vacuum-free or reduced vacuum zone is always formed in the joint region, i.e., the third zone always forms a part of the first zone which overlaps the third zone. Finally, the second zones always borders the first zone.

Advantageously, each conveyor support section is formed as a case-shaped body, in particular, as a suction or vacuum box, with the vacuum openings being formed in the covering of the case-shaped body.

According to a preferred embodiment of the invention, the support section is formed of a bent metal sheet and has two spaced side walls connected by the section covering, with transition arcuate edges provided between the side walls and the coverings, with the transition edges extending transverse to the conveying direction. The side walls, which define an U-shaped profile of two support sections, form the joint regions.

The vacuum openings and/or their cross-section and the opening-free regions of the conveyor belt are so arranged relative to each other, that a support area of the conveyor support, associated with a conveying article, has at least one uncovered or substantially uncovered opening for reliable retention of the conveying article. This means that the arrangement of the vacuum openings in the support section and the mesh geometry of the conveyor belt, displaceable on the support, should be selected taking into consideration the foregoing requirement of having at least one uncovered or almost uncovered vacuum opening in each article support area.

Advantageously, the conveyor belt is formed of a plastic material or includes a plastic material. Due to forming the conveyor belt from a plastic material, the belt has a high flexibility, that is, it is easily adapted to deflection portions of the support and has at that a very small weight. Besides, the plastic material easily slides on the support, whereby a frictional contact is substantially reduced. This also insures a jerk-free and smooth operation.

According to a further development of the invention, the support and/or the conveyor belt has a slide plastic layer formed, in particular, from polytetrafluorethylene (PTFE). The PTFE has very good sliding characteristics and is characterized by high heat-and cold resistance, so that heat or cold treatment of the articles can be conducted without problems.

As it has already been established above, the conveyor belt is formed as an endless belt, that is, is formed as a loop driven around guide pulleys, with the upper run, together with the conveyed articles, being displaceable through treatment zones, and with lower run, without articles, being displaceable to the initial position. The conveyed articles are treated with hot and/or cold air.

Therefore, the conveyor belt is made air-permeable. This means that the slide layer, covering the belt, is also air-permeable. Thus, the hot or cold air penetrates through the entire belt. The air-permeability of the conveyor support insures that a through-path is provided for the treatment hot or cold air. Thereby, stability of the conveyed articles on the conveyor belt is insured.

The conveyor belt of the conveyor is formed as a perforated or grid belt. Providing perforations in the conveyor belt insures its permeability. The air-permeability is likewise insured in the grid belt, where the mesh width is so selected that a single mesh is smaller than the support area of the treated article. This insures the stability of the conveyed articles on the conveyor belt.

As it has already been mentioned above, the conveyor belt is formed of a plastic material. An advantage of this consists in that the heat capacity of the conveyor belt is small. That means that the change of the temperatures at the entry and exit of a treatment zone results in small heat or energy losses. This permits to arrange different treatment zones, e.g., a hot zone and a cold zone, next to each other, with the conveyor belt being displaceable through both zones one after the other. Thus, the use of a plastic conveyor belt results in reduced energy costs.

Advantageously, as a plastic material, aramide fibers are used. When the conveyor band is formed of or includes aramide fibers, they are encased in the slide layer. The slide layer is formed preferably of the aramide fibers or PTFE. The use of the aramide fibers results in a high heat or chemical resistance, in high mechanical strength and elasticity. In addition, the conveyor belt formed of the aramide fibers is characterized by high form stability and flame resistance.

The polytetrafluorethylene is characterized by the same properties.

BRIEF DESCRIPTION OF THE DRAWINGS

The features and objects of the present invention will become more apparent, and the invention itself will be best understood from the following detailed description of the preferred embodiment, when read with reference to the accompanying drawings, wherein.

DETAILED DESCRIPTION OF THE PREFERRED EMBODIMENT

Figure 1:
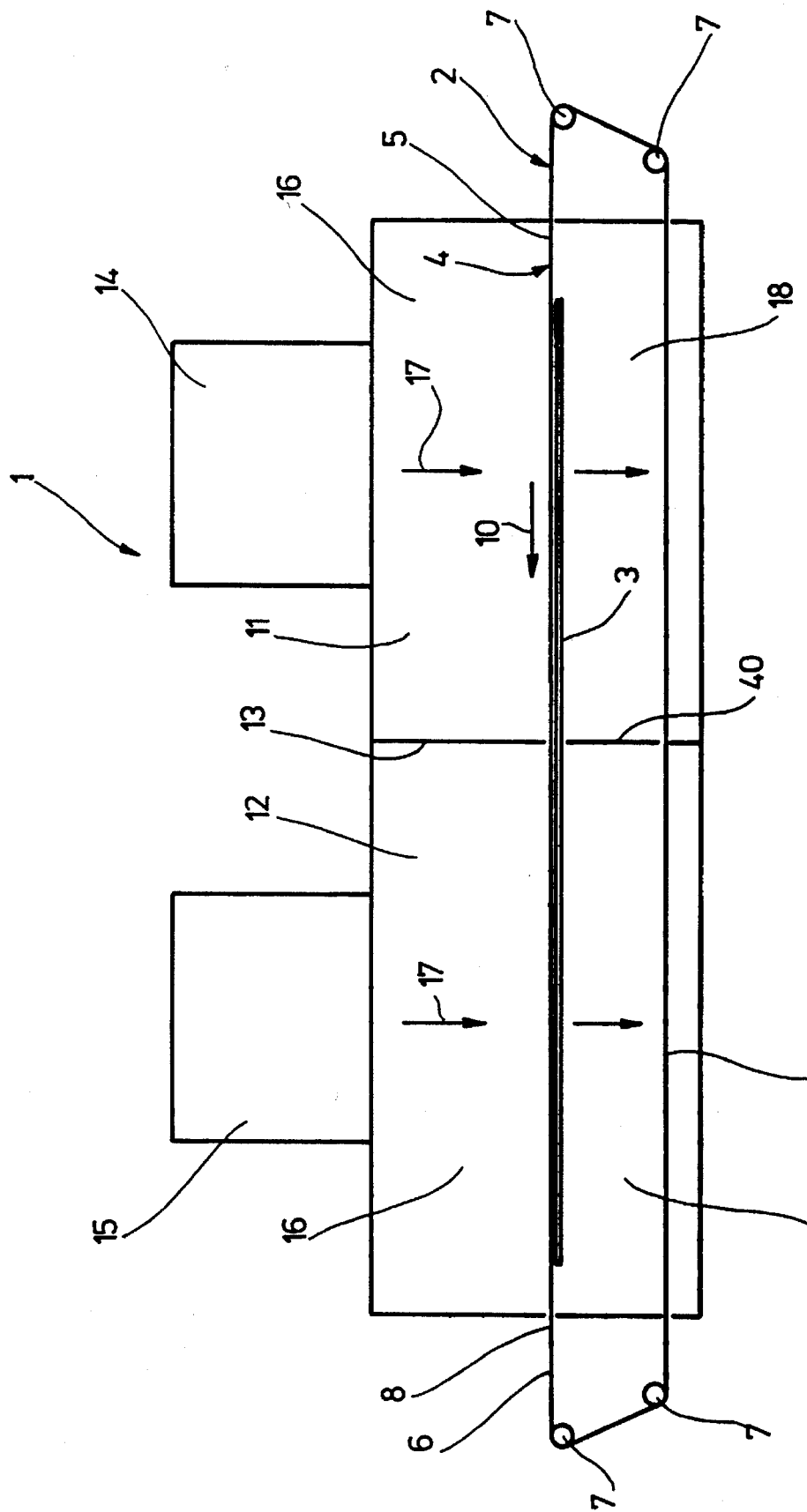
FIG. 1 shows a schematic view of an article treatment apparatus according to the present invention.

An article treatment apparatus 1 according to the present invention is shown schematically in FIG. 1. The article treatment apparatus 1 includes a conveyor 2 for transporting articles. The conveyor 2 has a stationary support 3 and transporting means 4 displaceable relative to the support 3. The transporting means 4 is formed as a conveyor belt 5. The conveyor belt 5 is formed as an endless loopband displaceable about pulleys 7.

The conveyor belt loop 6 has an upper run 8 and a lower run 9. A not-shown drive displaces the conveyor belt 5 about the pulleys 7 in a direction shown by an arrow 10. The conveyor belt 5 transports articles, which are supported on the upper run 8, for example, lacquered, to-be-dried boxes, through treatment zones 11 and 12 of the apparatus 1. Feed and discharge conveyors for feeding the boxes to the apparatus 1 and for removing the treated boxes therefrom are not shown in FIG. 1 for the sake of clarity.

The treatment zones 11 and 12 are separated from each other by a separation wall 13 which provides an appropriate compartmentalization. In this embodiment, the separation wall 13 defines a junction 40. The apparatus 1 includes entry and exit locks (not shown) associated with the upper runs 8.

The treatment zone 11 is associated with a fan heater 14, and the treatment zone 12 is associated with a fan heater 15. The fan heater 14 delivers hot air into space 16 of the treatment zone 11, which is located above the conveyor 2 (in the direction of arrow 17). The hot air passes through the conveyor 2 and enters a space 18 which lies beneath the conveyor 2. From the space 18, the air is flown back to the fan heater. Thus, air circulation takes place. The same is applicable to the treatment zone 12.

In the embodiment of the apparatus shown in FIG. 1, the lower run 9 passes through the space 18. However, the space 18, through which the hot air is returned to the fan heater, could be separated by appropriate partition means from the lower run 9 to prevent heat losses.

Figure 2:
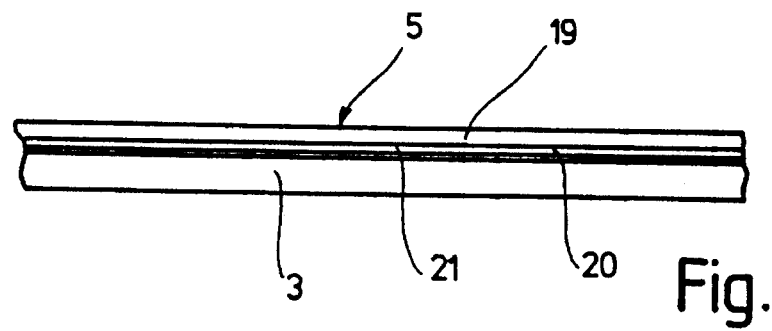
FIG. 2 shows a portion of a conveyor forming part of the article treatment apparatus according to the present invention.

The conveyor 2, a portion of which is shown in FIG. 2, includes a base member 19, which defines the conveyor belt 5 and the bottom 20 of which is covered with a slide plastic layer 21. A slide plastic layer can also be provided on the top surface of the base member 19, that is, the base 19 can be covered with a slide plastic layer on all sides.

The conveyor belt 5, that is, the base member 19, lies on the support 3 with its slide plastic layer 21, and the support 3 has a flat surface for supporting the conveyor belt 5 (the base body 19). This insures reliable transportation of the articles.

Providing the conveyor belt 5 (base body 19) with a slide plastic layer insures substantially non-jerky sliding of the belts on the stationary support 3 which, in turn, insures an optimal and disturbance-free operation of the article treatment apparatus.

Figure 3:
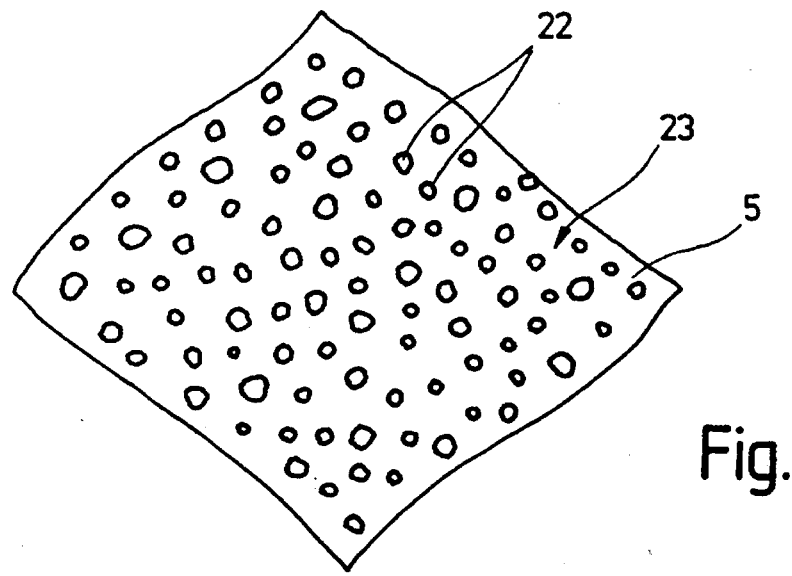
FIG. 3 shows a plan view of a portion of a conveyor belt of the conveyor shown in FIG. 2.

In order to insure the hot air circulation, the conveyor belt 5 is provided, as shown in FIG. 3, with holes 22 which serve for flowing the hot air therethrough. Thus, the conveyor belt 5 is formed as a perforated band 23. The air-permeable belt 5 is provided with an air-permeable slide plastic layer, the layer 21.

It should also be mentioned that in the embodiments shown, the slide plastic layer may be provided on the support 3, with the same advantages, as discussed above, being achieved. It is also possible to provide with the slide plastic layer both the conveyor belt 5 and the support 3.

Figures 4, 5:
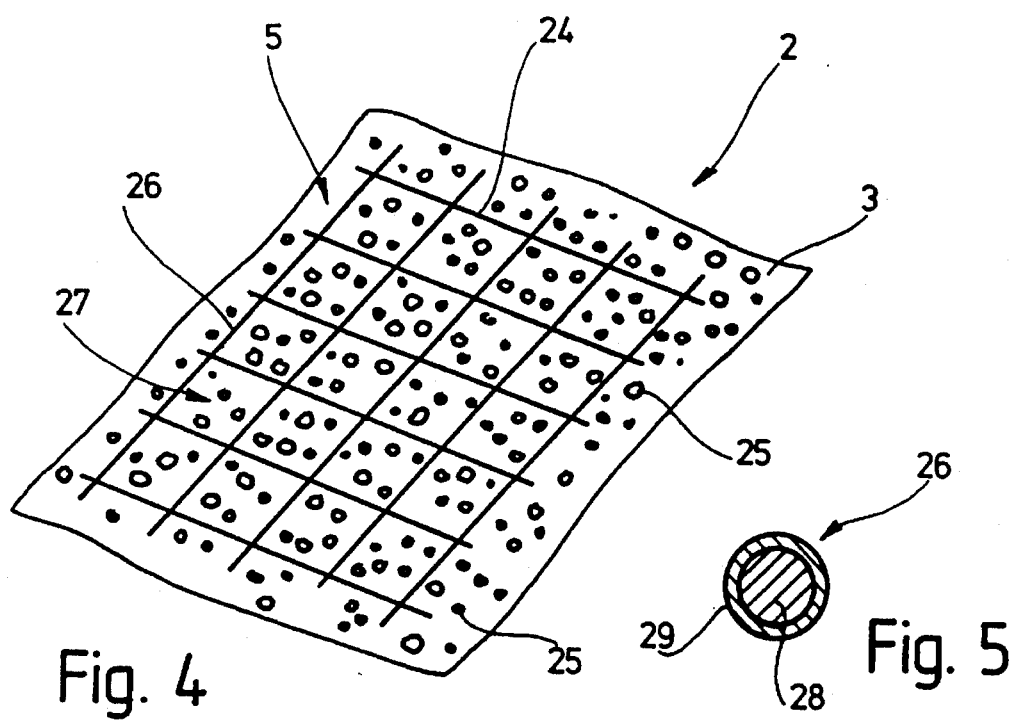
FIG. 4 shows a plan view of a portion of another embodiment of a conveyor according to the present invention.
FIG. 5 shows a cross-sectional view of a rod which forms the meshes of the grid shown in FIG. 4.

FIG. 4 shows a plan view of an embodiment of the conveyor 2 according to the present invention. As shown in FIG. 4, the conveyor band 5 is formed as a grid band 24 displaceable over the stationary support 3. To enable the hot air from the fan heaters 14 and 15 to penetrate through the conveyor 2, vacuum openings or slots 25 are provided in the stationary support 3. Providing vacuum openings 25 in the conveyor support 3 permits to provide a contiuous support structure or a structure, formed of several parts, that insures a good stability of conveyed articles.

The arrangement of the opening 25 in the support 3 formed of several support sections 41 will be explained in more detail below, with reference to FIGS. 6 and 7. The grid belt 24, shown in FIG. 4, is formed of mutually perpendicular rods 26 which define separate meshes 27 of the grid belt 24. Here, it should be pointed out that the dimensions of the meshes 27 are smaller than the dimensions of articles supported thereon and conveyed through the article treatment apparatus 1. The grid belt can be formed of a plastic material, e.g., aramide fibers, covered with polytetrafluor-ethylene (PTFE) layer.

A cross-section of a rod 26 is shown in FIG. 5. The rod 26, as shown in FIG. 5, is formed of a rod core 28 with a PTFE layer 29.

Figure 6:
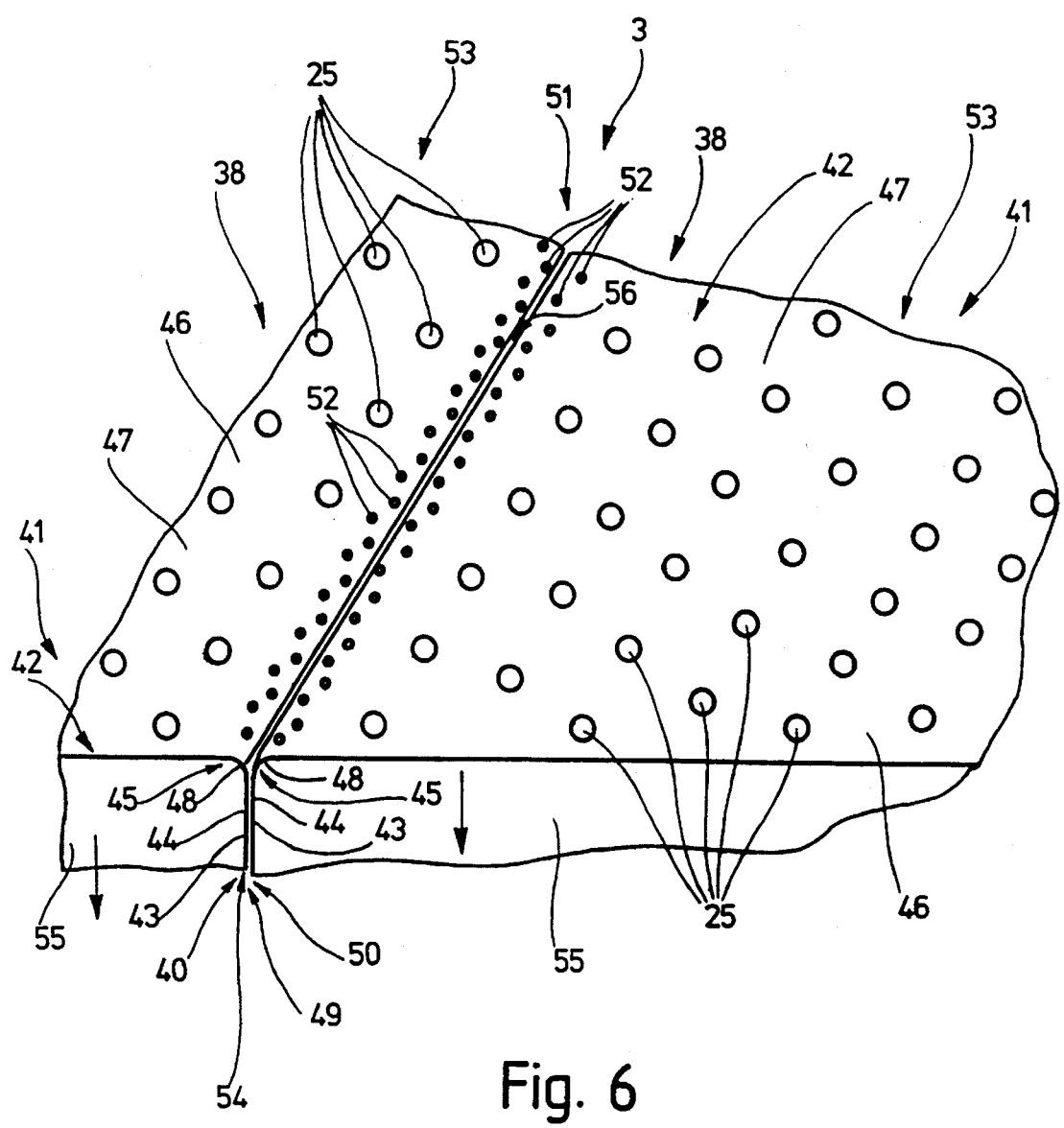
FIG. 6 shows a perspective view of a portion of a conveyor support.

FIG. 6 shows, as it has already been discussed in the Brief Description of the Drawings, a perspective view of a portion of the conveyor support 3 according to the present invention.

The conveyor support 3, as shown in FIG. 6, is formed of support sections 41 made of a bent metal sheet 42. The bent metal sheet 42 has a U-shaped profile, with both legs 43 of each support section 41 (in FIG. 6, a single leg 43 of each support part 41 is shown) being represented by a side wall 44. The circular edges 45 form a transition from side wall 44 to coverings 47 which form intermediate sections 46. The arcuate edges 45, which define transition portions between side walls 44 and coverings 47, have a bending radius 48. The side walls 44 extend parallel to each other and transverse to the conveying direction.

In this position, a seam 49 is formed by the two side walls 44 of two adjacent support sections 41. The seam 49 defines a vacuum-free zone 50 or a zone with a reduced vacuum. The covering 47 of each support section 41 is divided in three zones. The first zone 51, which also includes a vacuum-free zone 50, contains vacuum openings 52.

The vacuum openings 52 are provided in border regions of the adjacent sections, the junction of which form the seam 49. The other vacuum openings, openings 25, lie in a second zone 53 of the covering 47, with the second zone 53 located between two first zones 51 of each support section 41.

The third zone 54 is formed solely by the seam 49 or joint 40. The third zone 54 defines the vacuum-free or reduced vacuum zone 50. Thus, the first zone 51 overlaps or incorporates the third zone 54.

In the embodiment of the conveyor, a portion of which is shown in FIG. 6, each support portion 38, which is formed by the covering 47 of a respective support section 41, is associated with a vacuum chamber 55 that communicates with vacuum openings 25 and 52.

Because the support 3 is formed of several sections 41, infiltrating air channels 56 are formed in the joint 40. The infiltrating air channels 56 reduce, in the region of the joint 40, the influence of the vacuum created in the vacuum chambers 55. It is in order to prevent the reduction of vacuum in the region of the joint 40 and, thus, in the first zone 51, that the vacuum openings 52 are provided.

The vacuum openings 52 have a larger common operational cross-section than that of the channels 56, so that the infiltration of air through the channels 56 and the resulting reduction in vacuum is compensated by an increased vacuum action through the openings 52.

The required pattern of the vacuum openings 52 in the first zone 51 corresponds to the size of the conveyed articles, the mesh geometry of the conveyor belt 5, and the geometry of the infiltration air channels 56. The required pattern of the vacuum openings 52 is selected based on the stability requirements and/or on the requirements of the treatment process, for example, a drying process, which determines the flow volume of the hot air through the conveyor belt.

The arrangement and the pattern of the vacuum openings 25 in the second zone 53 is likewise determined by the size of the conveyed articles or boxes and by the desired pressure drop of the hot air stream. The arrangement and the pattern of the vacuum openings 25 define the necessary vacuum beneath the conveyor belt. At that, the arrangement and the pattern of the vacuum openings 25 is determined with taking into consideration the obstruction formed by mutually intersecting rods 26 of the grid belt 24.

It should be understood that the size, the pattern and the cross-section of the vacuum openings 25 in the second zone 53 and of the vacuum openings 52 in the first zone 51 are not limited to those shown in FIG. 6 and can be different. However, it should be insured, whatever the pattern and cross-section of the vacuum openings is chosen, that the cross-sectional area, through which vacuum acts on the conveyed boxes, of the first zone 51 is larger than the cross-sectional area of the vacuum openings in the second zone 53, in order to compensate the air infiltration that takes place in the third zone 54.

Also, when selecting the cross-section of the openings 25 and 52, care should be taken that the openings are at least sufficiently large so that the rods 26, which form the grid belt 24, cannot completely cover or cannot cover a greater portion of separate openings. The size of the openings, however, is limited toward the top because, with increased size of the opening but the same open cross-section, the spacing between the openings, i.e., their separation, should become larger.

Again, the size of the openings toward the top is limited by the contact surface of the boxes, because at each moment, during conveying the boxes on the conveyor belt 5 through the treatment zones 11 and 12, a sufficient number of the vacuum openings 52 and 25 should be provided beneath the boxes. For the sake of clarity, the conveyor band 5 is not shown in FIG. 6.

Figure 7:
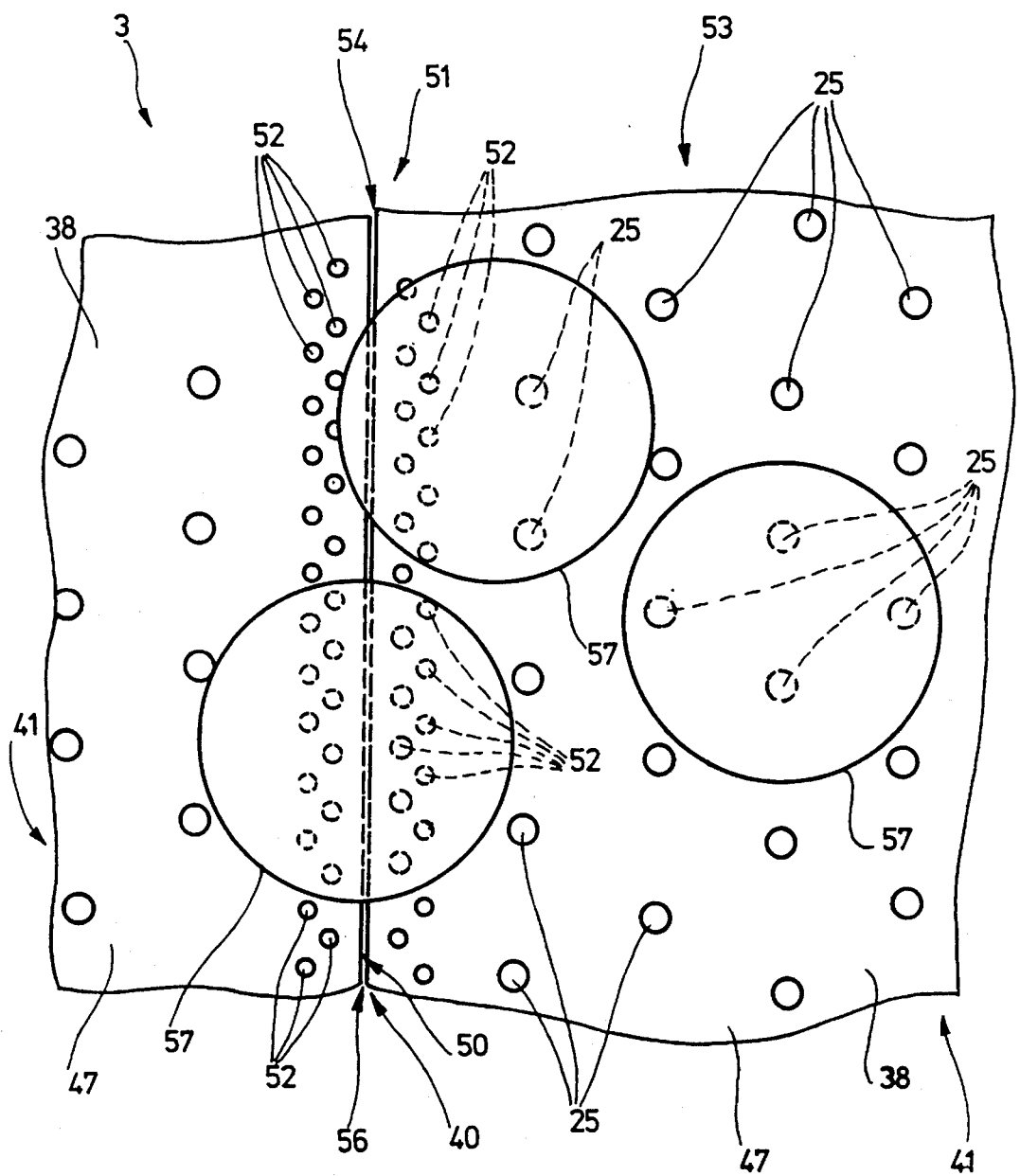
FIG. 7 shows a plan view of a portion of a support of a conveyor according to the present invention.

In FIG. 7 the conveying articles or boxes are represented by circles 57. For illustration purposes, an "article" is shown in three different "positions". A normal position is represented by a circle 57 in the right portion of FIG. 7. The second, border or edge position, is represented by a circle 57 in the upper portion of FIG. 7. The third, transfer position is represented in the lower portion of FIG. 7.

In the normal position, the article or the circle 57 covers four vacuum openings 25. They insure suction of so much of hot air that a required vacuum beneath the article, even considering the obstruction presented by the grid conveyor belt, is obtained.

In the edge position, the article or the circle 57 covers a smaller number of openings 25, a number of openings 52 in the covering 47 of the right portion 38, and a part of the joint 40. However, in the border position, the circle 57 does not cover the openings 52 of the covering 47 of the left portion 38. The large operational common cross-section of the vacuum openings 52 compensates the air infiltration through the channels 56 in the joint 40 by insuring a large flow volume through the openings 52.

When the vacuum openings 52 and the vacuum openings 25 are arranged more closely to each other than the vacuum openings 25 in the second zone 53, the acting cross-sectional area is further increased and better results are achieved.

In the transfer position, the circle 57 is located directly in the middle of the joint 40 of the two adjacent portions 38, and the air infiltration through channels 56 is compensated by a larger cross-sectional area of vacuum openings 52 on both sides of the joint 40.

It should be clear that by correct selection of the conveyor belt 5 and of an appropriate size and arrangement of the vacuum openings 25 and 52 in the coverings 47 of support sections 41, the infiltration of air through vacuum-free or reduced vacuum zones 50 (third zone 54), can be compensated. This insures an optimal stability of the articles during conveying the articles through the treatment zones 11 and 12.

Though the present invention was shown and described with reference to preferred embodiments, various modifications thereof will be apparent to those skilled in the art and, therefore, it is not intended that the invention be limited to the disclosed embodiments or details thereof, and departures may be made therefrom within the spirit and scope of the appended claims.

What is claimed is:

1. An article treatment apparatus, comprising:
   at least one treatment zone; and
   a conveyor for conveying articles through the treatment zone, said conveyor comprising a support provided with a plurality of vacuum openings along a longitudinal extent of said support, and air-permeable article-conveying means displaceable along said support,
   wherein said support is formed of at least two support sections abutting each other and defining together a joint region; and
   wherein an operational cross-section of vacuum openings located in a support area for a single article and located at least partially in the joint region, is larger than an operational cross-section of vacuum openings in a support area for a single article and located in a region other than the joint region.

2. An article treatment apparatus as set forth in claim 1, wherein each support section has a first zone defining with the first zone of another support section the joint region, and a second zone remote from the joint region, and wherein a number of vacuum openings in the first zone is greater than a number of vacuum openings in the second zone.

3. An article treatment apparatus as set forth in claim 2, wherein at least some of the vacuum openings located in the first zone have a smaller cross-section than at least some of the vacuum openings located in the second zone.

4. An article treatment apparatus as set forth in claim 1, wherein a support area of said support associated with each conveyed article has at least one vacuum opening, independent of a position of the article.

5. An article treatment apparatus as set forth in claim 1, wherein each support section is associated with a separate vacuum chamber that communicates with associated vacuum openings.

6. An article treatment apparatus as set forth in claim 2, wherein said joint region defines a third, vacuum-free zone.

7. An article treatment apparatus as set forth in claim 2, wherein said joint region defines a third, reduced vacuum zone.

8. An article treatment apparatus as set forth in claim 1, wherein each support section is formed as a case body, with a support portion of each support section being formed by a covering of said case body.

9. An article treatment apparatus as set forth in claim 8, wherein said case body is formed as a suction box.

10. An article treatment apparatus as set forth in claim 1, wherein each support section is formed by a bent metal sheet comprising a leg having two sides, an intermediate section defining a support section covering, and transition edge means between the sides and the covering, with the transition edge means extending transverse to a conveying direction.

11. An article treatment apparatus as set forth in claim 1, wherein said conveying means comprises a conveyor belt.

12. An article treatment apparatus as set forth in claim 1, wherein said support and said conveying means are air-permeable.

13. An article treatment apparatus as set forth in claim 12, wherein said conveyor belt is formed as one of a perforated belt and a grid belt.

14. An article treatment apparatus as set forth in claim 12, wherein said conveyor belt is formed of a plastic material.

15. An article treatment apparatus as set forth in claim 12, wherein said conveyor belt at least includes aramide fibers.

16. An article treatment apparatus as set forth in claim 1, comprising several treatment zones through which said conveyor runs.

17. An article treatment apparatus as set forth in claim 1, wherein said conveyor is formed as an endless conveyor.

18. An article treatment apparatus as set forth in claim 1, wherein at least one of said support and said conveying means is formed of a slide plastic material.

19. An article treatment apparatus as set forth in claim 18, wherein said slide plastic material comprises polytetraflourethylen.

20. An article treatment apparatus as set forth in claim 1, wherein said support and said conveying means have mutually contacting surfaces, and wherein at least one of the mutually contacting surfaces is formed of a slide plastic material.

21. An article treatment apparatus as set forth in claim 20, wherein said slide plastic material comprises polytetraflourethylen.

* * * * *